United States Patent [19]

Bras

[11] Patent Number: 4,545,205
[45] Date of Patent: Oct. 8, 1985

[54] STIRLING CYCLE OR COMPRESSOR-TYPE THERMAL ENGINE HAVING A POWER SOURCE POSITIONED EXTERNALLY TO OR INTERNALLY TO ITS CYLINDERS

[75] Inventor: Jean Bras, Toulouse, France

[73] Assignee: Ste. Gaz de France, St. Denis, France

[21] Appl. No.: 572,850

[22] Filed: Jan. 23, 1984

[30] Foreign Application Priority Data

Jan. 24, 1983 [FR] France .................... 83 01128

[51] Int. Cl.⁴ .................... F02G 1/04
[52] U.S. Cl. .................... 60/525
[58] Field of Search .................... 62/6; 60/525; 92/67–69, 120, 165

[56] References Cited

U.S. PATENT DOCUMENTS 4,407,123 10/1983 Morgan .................... 60/525

FOREIGN PATENT DOCUMENTS

| 2406684 | 8/1975 | Fed. Rep. of Germany . |
| 1001748 | 2/1952 | France . |
| 1176758 | 4/1959 | France . |
| 1432977 | 6/1966 | France . |
| 1553277 | 1/1969 | France . |
| 2003686 | 11/1969 | France . |
| 2193413 | 2/1974 | France . |
| 2279940 | 2/1976 | France . |
| 8494 | 7/1914 | United Kingdom . |

Primary Examiner—Allen M. Ostrager
Attorney, Agent, or Firm—Sandler & Greenblum

[57] ABSTRACT

A thermal engine with a power source located either externally or internally to its cylinders, such as a compressor or Stirling cycle engine. The engine includes a plurality of chambers in each which a double-effect piston is mounted. Each piston and chamber together form an expansion phase side and a compression phase side. Each expansion side of one piston and chamber assembly communicates via a fluid transfer circuit with a compression side formed by another piston and chamber assembly and directly opposite the expansion side. Each fluid transfer circuit is traversed by a gas conveyed from one chamber to the other by movement of the pistons. Each piston is equipped with an arm cooperating with means for transforming reciprocal circular motion of the pistons into circular motion of an output shaft. The chambers are distributed around the transforming means and the output shaft. Each chamber, piston and each expansion and compression side have a toroidal shape.

38 Claims, 13 Drawing Figures

STIRLING CYCLE OR COMPRESSOR-TYPE THERMAL ENGINE HAVING A POWER SOURCE POSITIONED EXTERNALLY TO OR INTERNALLY TO ITS CYLINDERS

BACKGROUND OF THE INVENTION

1. Field of the Invention

This invention relates to thermal engines having power sources external or internal to their cylinders, such as, for example, Stirling cycle or compressor-type engines.

2. Description of Pertinent Information

Thermal engines have been designed with their power sources located externally or internally to their cylinders. For example, one type of thermal engine has pistons that reciprocate in linearly arranged cylinders. Appropriate connecting rod assemblies and seals are associated with this type of engine. Another type of thermal internal combustion engine uses opposed pistons travelling alternating linear trajectories in a polygonally-shaped engine, such as disclosed in French Pat. No. 1,176,758. This polygonal type of engine is more well-known by the name "Delta" engine. Still another type of thermal engine is a toroidal cylinder engine having orbital pistons in which thermal cycle phases are obtained by direct uncovering of exhaust ports on the pistons' trajectories. This type of engine is equipped with rotating port closures subject to rapid and intermittent actuation by a cam, as disclosed in French Pat. No. 1,432,977.

Three other types of thermal engines with power sources external or internal to their cylinders have been developed. Toroidal internal combustion engines use pistons that are subject to centrifugal forces and move in a circular path and transmit an alternate circular movement to an oscillating lever drive shaft, as disclosed in French Pat. No. 2,003,286. Rotating pistons of the epitrochoidal type have two stage operating characteristics, such as disclosed in French Pat. No. 2,037,381. Finally, Stirling cycle engines have been developed in which pistons reciprocate in linearly-aligned cylinders and are attached to rhomboidally-shaped connecting rod assemblies attached to crankshafts. Engine sealing is accomplished by means of a rolling skirt and counterpressure. In addition, Stirling cycle engines comprising four cylinders of a barrel type having double-effect pistons actuating guide blocks that function as a simplified crankshaft have been developed.

Engines with external or internal power sources, the most characteristic of which have been described above, suffer from a variety of disadvantages. First, these are frictional losses inherent in the kinematics of these engines due to the large trajectory of their components. Second, frictional forces arise at a large distance from the rotational axis of many components. The intensity of these frictional forces is increased by centrifugal forces of the moving components and by the movement of components arising from the thrust of gases in the engine. Third, problems exist with the dynamic tolerances among components in which reciprocating or angular movement with respect to each other is comparatively great. In addition to these disadvantages, Stirling cycle engines present problems due to variations in power output. Power variations are caused by injection of a fuel, e.g., hydrogen, at the beginning of isothermal compression by means of a very sensitive, high pressure distributor.

Stirling cycle engines have chambers that together with their associated pistons form a "hot side" of the piston or hot gas phase "envelope" and a "cold side" of the piston or cold gas phase "envelope". Hot and cold sides or envelopes are connected by connecting means comprising a thermal accumulator or regenerator, a cold source, and a heat source. Gas alternately traverses the cold and hot envelopes.

In these Stirling cycle engines, problems can occur due to load losses resulting from the complexity of the connections between the hot and cold sides or envelopes. For each connecting two envelopes or sides, the arrangement of the cylinders forms nests of boiler tubes having elements of various shapes and lengths lacking hydraulic equipotentiality and leading to different outputs.

Finally, the prior art thermal engines described above require the use of a great number of different mechanical parts that presents maintenance problems due to the difficulty in replacing hard-to-find parts.

SUMMARY OF THE INVENTION

Therefore, there is a need for a thermal engine that mitigates the above-mentioned disadvantages and problems. This need is satisfied by the present invention that is directed to a thermal engine in which the shape of the chambers, the shape of the pistons, and the kinematics of the engine are designed so as to decrease frictional losses and reduce the path of frictional forces produced by the engine.

In addition, it is also an object of the present invention to decrease the length of the path travelled by the moving components of the engine that provides a simple solution for total dynamic sealing of engine components with negligible frictional losses. It is still another object of the present invention to provide a Stirling cycle engine in which the problem of power variation is solved in a simple manner.

Still another object of the present invention is to produce a Stirling cycle engine in which the physical transfer of gases from the hot side or envelope to the cold side or envelope occurs with reduced load losses to the engine.

To accomplish these objectives, the present invention comprises several chambers in which each has mounted a double-effect piston. The chambers and piston together form an expansion or hot side on one side of the piston and a compression or cold side on the other. These chambers are connected via an appropriate transfer circuit in such a way that each expansion envelope, comprising a chamber and piston assembly, is in correspondence with a compression envelope formed by another chamber and piston assembly. Movement of the pistons transfers a mass of gas from one chamber to the other. Each piston is equipped with a connecting arm assembly cooperating with a means for transforming the reciprocating movement of the pistons into a circular motion transmitted to an output shaft. Each compression gas phase envelope or cold side of a piston and chamber assembly is, therefore, disposed directly opposite an expansion or hot side of another piston and chamber assembly. In addition, the chambers are distributed around the means for transforming the reciprocating movement of the pistons and around the output shaft. Each chamber, each piston, and each hot and cold side of the piston is in the shape of a toroidal sector.

According to another characteristic of the invention, the arm connected to each piston is integral with a shaft that is rotatably mounted in bearings. According to another characteristic of this Stirling cycle thermal engine, the transfer circuit connecting the expansion side of one chamber and the compression side of another chamber is itself connected to an adjustable volume chamber such that by varying the volume of this chamber, the power of the engine is changed.

BRIEF DESCRIPTION OF THE DRAWINGS

Other characteristics and advantages of the invention will become more apparent upon reading the description of the preferred embodiments of the engine by way of non-limiting examples and by referring to the accompanying drawings in which.

DETAILED DESCRIPTION OF PREFERRED EMBODIMENTS

Figure 1:
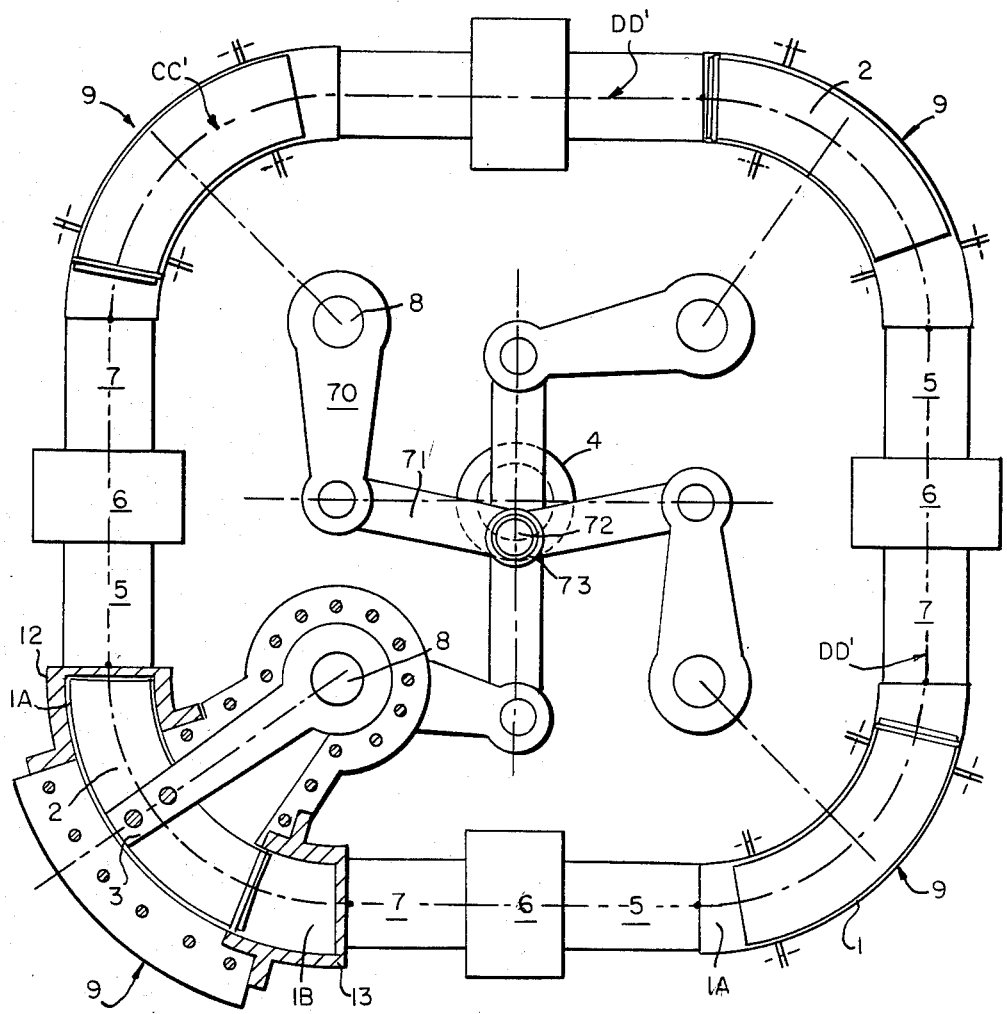
FIG. 1 is a top view of the engine according to the present invention.

As shown in FIG. 1, the engine according to the invention comprises several identical and separate engine blocks 9, each of which is provided with a chamber 1 in which a double-effect piston 2 moves. Rigid arm 3 is rigidly secured to piston 2 and functions as a connector to a means for transforming the reciprocating movement of the piston into a continuous circular motion transmitted to a shaft 4.

Chambers or cylinders 1 are distributed along the periphery of the engine around shaft 4 and around the means for transforming the movement of the pistons into circular motion. Chambers 1 are distributed in a single plane so as to form a flat and therefore compact engine.

Pistons 2 are connected to the means for transforming the movement of the pistons such that the displacement of each piston 2 is offset 90° out of phase with respect to the displacement of the neighboring pistons. The power of the engine and its output depend upon the angle of this phase deviation between adjacent pistons.

Each piston and chamber assembly forms a hot or expansion phase side 1A and a cold or compression phase side 1B; these two sides are located on each side of each piston. The four chambers 1 are interconnected such that each expansion phase side 1A formed by a piston and chamber assembly is in direct communication via an appropriate transfer circuit with a compression phase side 1B formed by another chamber and piston assembly. The two sides thus are situated directly opposite each other. The transfer circuit connects the hot and cold sides of the chamber and piston assemblies, and a mass of gas is alternatively conveyed from one of the sides to the other by movement of the pistons.

Chambers 1 and pistons 2 have the shape of a toroidal sector; therefore the hot and cold sides, defined by each corresponding chamber and piston, have the shapes of a toroidal sector. Each chamber comprises two end walls, each positioned along a plane meridian to the toroidal sector. These end walls are also the end walls of each hot and cold side of each chamber. A circumferential arc CC', seen in FIG. 1, is centered at the axis of each toroidal sector, is located in the equitorial plane of each toroidal sector, passes through the center of all the meridian sections of chamber 1, and is positioned between the two end walls of chamber 1. Arc CC' has a value equal to $\pi/2$ radians.

Four transfer circuits are shown along an axis DD'. Each transfer circuit is of the same length and is coaxial to its axis DD'. Axes DD' are each positioned along the sides of a square centered on shaft 4, the four circumferential arcs CC' each form one rounded corner of the square so that when axes CC' and DD' are linked together, they describe a square with rounded or toroidally-shaped corners centered about shaft 8. In addition, the four axes DD' are tangent by pairs to a same circumferential arc CC' and are connected to the end of this arc. In other words, each axis DD' is tangent to the two arcs CC' to which each axis DD' is connected. Also, the four centers of the four arcs CC' are positioned, respectively, at the corner of a square centered on shaft 4. Each side of this square is parallel to two axes DD'.

Considering a single transfer circuit, the end walls of the expansion side and compression side preferably are perpendicular and coaxial to axis DD' of the transfer circuit. These two walls therefore are parallel to each other and are positioned directly opposite one another along a shared axis DD', as seen in FIG. 1.

Figure 4B:
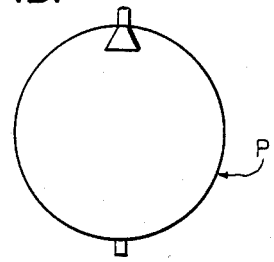
FIG. 4b is a schematic view of pump P for pumping pressurized fluid through aperture 66.
Figure 4:
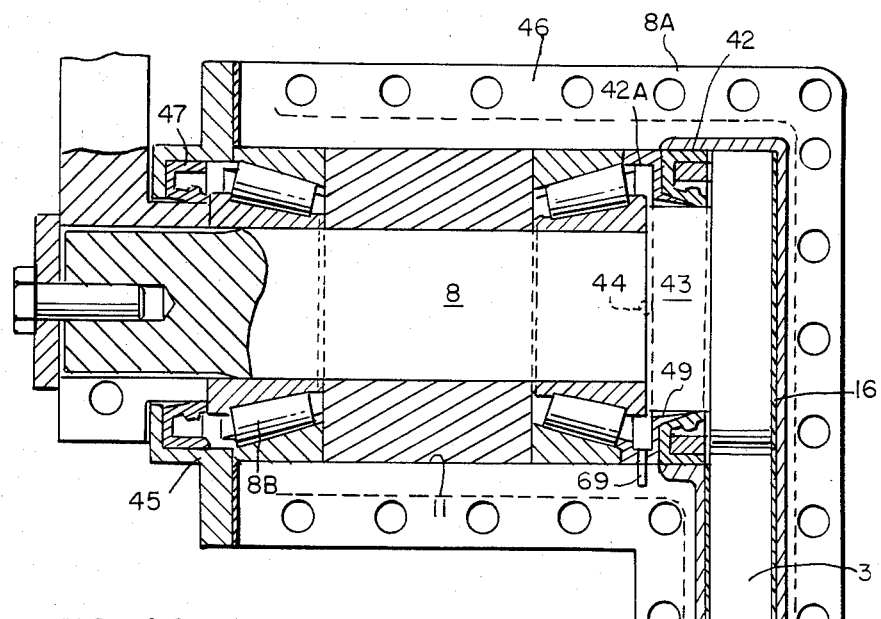
FIG. 4 is a cross-sectional view along line AA of FIG. 3.

As seen in FIG. 4, arm 3 of each piston is rigidly secured to a shaft 8 mounted on bearings 8A and 8B. The piston that moves in a reciprocating circular manner is thus guided in the chamber not by the toroidal surfaces of the chamber but by shaft 8 mounted on bearings 8A and 8B. Four separate shafts 8 are located on the top of the described square, at each corner of which the centers of circumferential arcs CC' are positioned.

The alternating movement of pistons 2 transmitted to shafts 8 by arms 3 eliminates interfering forces far from the rotational axis of the engine. In addition, the angular motion of shaft 8 causes only small relative displacements that are a function of the shaft diameter and the magnitude of movement of the shaft. Moreover, the alternating angular motion of shaft 8 can be coupled directly and coaxially with another receptor shaft of a receptor engine built according to the same architecture. This receptor engine, for example, can comprise a compressor connected to shaft 8 so that the compression phase of a compressor piston of the compressor is associated with the expansion phase of the engine piston. As a result, the size of the connection of the phase deviation mechanism between each of the four double-effect pistons can be reduced. The phase deviation mechanism transforms the alternating movement of the pistons into circular movement of shaft 4 as will be explained below. In addition, there is also a reduction in energy losses due to movement transformation mechanisms because the alternating circular motion of the receptor is directly connected to the alternating circular motion of the engine, rather than connecting the engine to the receptor via a linear alternating-crank rod-rotation -rotation-crank rod-linear alternating connection.

Figure 2:
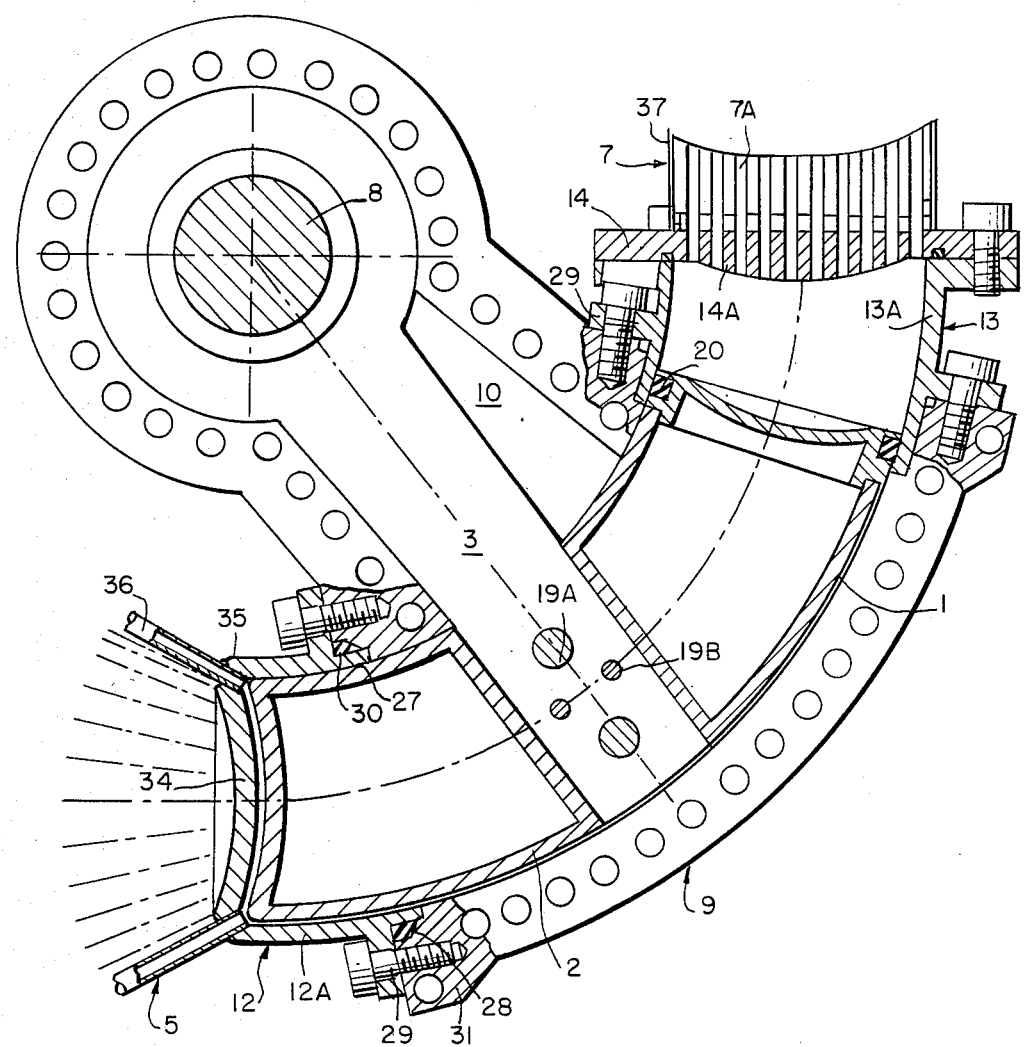
FIGS. 2 and 3 are cross-sectional views of a toroidal housing of the engine showing the power variation means.
Figures 3, 3A:
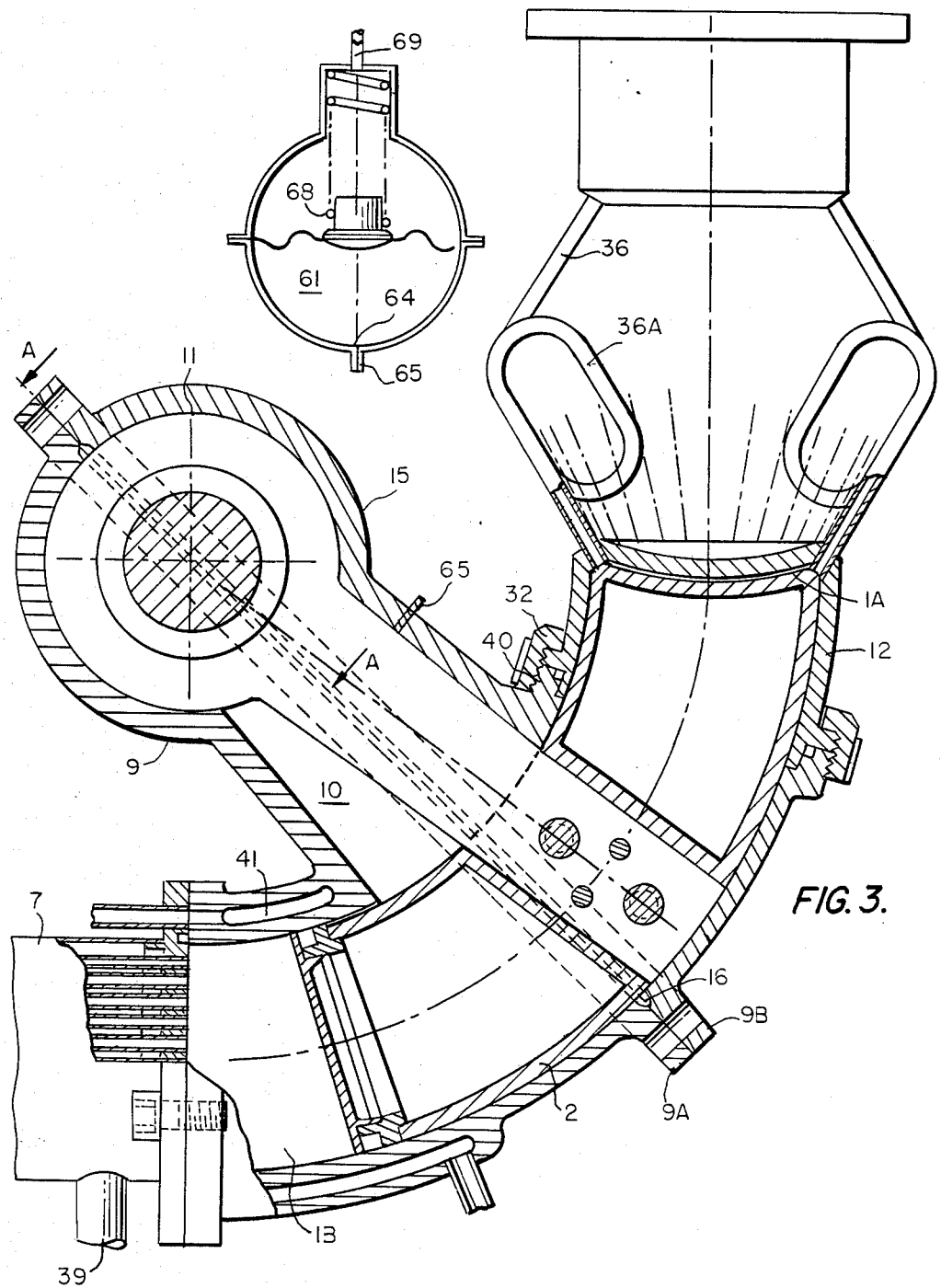
FIG. 3A is a schematic cross-sectional view of an adjustable volume chamber 61.

Engine blocks 9 are regularly distributed around the means for transforming the alternating movement of the pistons and around the axis of shaft 4. Each engine block 9 has a toroidal shape and comprises a toroidally-shaped chamber 1, a cylindrically shaped sector positioned radially with respect to toroidal chamber 1, and a cylindrical bearing body 15 perpendicular to the cylindrically shaped sector, as seen in FIGS. 2 and 3.

In the cylindrically shaped sector, a housing 10 is provided for arm 3. This housing communicates with chamber 1 and has a cylindrical shape to ensure sufficient clearance for arm 3. A housing 11, also cylindrically-shaped, is provided in cylindrical bearing body 15. Shaft 8 and bearings 8A and 8B are disposed in body 15.

In order to assist in the assembly of piston 2, arm 3, shaft 8 and bearings 8A and 8B, each block 9 is split preferably in two half-shells 9A and 9B, which are assembled together by bolts. These two metal half-shells mate along surfaces longitudinal and median to chamber 1, as shown in FIG. 4, or along a mating surface transverse to chamber 1 and median to housing 11 of shaft 8, as shown in FIGS. 2 and 3. The seal between the two half-shells 9A and 9B can be effected by any known means and procedures, such as by tinning and tightening by means of prestressed bolts and then heating and assembling the hot mating surfaces with subsequent low temperature welding, (FIG. 2), or by interposition of a sealing joint or gasket 16 known in the art (FIG. 4).

Chamber 1 of each block has a diameter sufficient to ensure that each piston 9 moves without frictional contact with the walls of the chamber. Moreover, the piston comprises means for effecting a rigid connection to arm 3 to neutralize the effect of centrifugal forces and the thrust of gases and inertial forces. The dimensions of the chamber and the piston take into account residual deformation due to stress and expansion of the components to avoid any danger of contact and friction between the piston in chamber 1.

Figure 5:
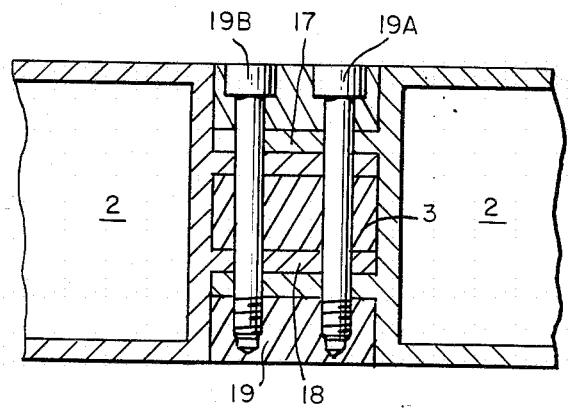
FIG. 5 is a detailed cross-sectional view of the connection of the piston to its arm.

Piston 2 preferably comprises two hollow toroidally-shaped parts connected to each other and to arm 3 in a rigid manner by connection means. This connection means comprises two caps 17 and 18, as shown in FIG. 5, respectively, integral with one of the portions of the piston that overlaps one another during assembly of the engine and which encloses the end of arm 3. The connection means further comprises two tightening means 19 in contact with external cap 17 to comprise a thermal rupture. Two screws 19A and 19B completely traverse the arm and the connecting rods 3 and maintain means 19 pressed thereagainst as seen in FIGS. 4 and 5.

The connection of the pistons with arm 3 can further comprise a thermal insulator to prevent losses by conduction.

The cold side of the piston, i.e., the side formed with chamber 1 comprising the compression phase side, is equipped with at least one sealing piston-ring 2A that separates the cold side from the pressurized enclosure of the same engine block. This pressurized enclosure is formed by the hot side of this engine block by the reduced portion of chamber 1 not occupied by the piston and by housing 10 of arm 3. Sealing piston-ring 2A is held in position by a removable element 2B that permits the replacement of piston-rings without dismantling of the piston, as seen in FIG. 6.

Figure 6:
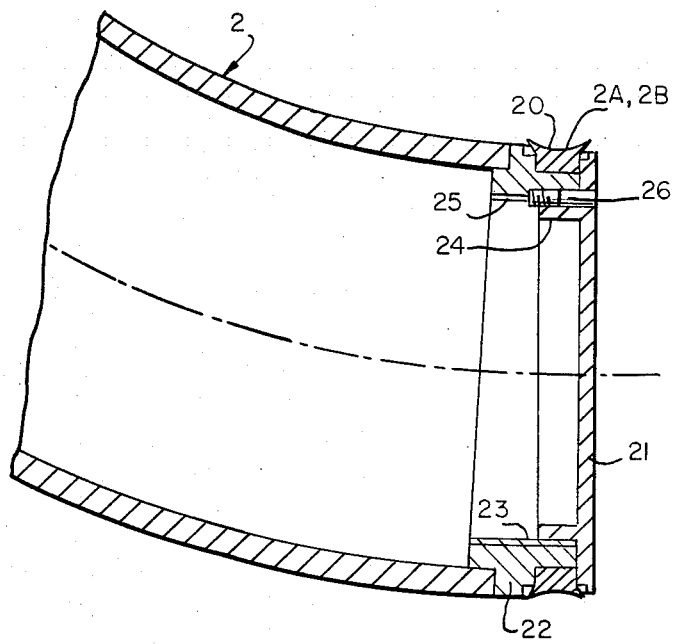
FIG. 6 is a detailed cross-sectional view showing the assembly of the piston-rings on the piston.

Sealing piston-ring 2A comprises two annular lips, shown in FIG. 6, and is mounted on tubular element 22 inserted at the end of the piston. Tubular element 22 receives removable metal disk 21 that facilitates installation of the piston-ring. Tubular element 22 has an annular shoulder that forms a piston-ring groove together with the removable metal disk 21. Removable metal disk 21 is provided with a threaded annular shoulder 24 that cooperates with an inner thread 25 located on the inside surface of tubular element 22. The connection between disk 21 and element 22 is provided by a screw 26 provided in a aperture simultaneously located in tubular element 22 and in metal disk 21 at the level of their threaded portion. This type of connection, however, is only a single example of a variety of connections that are within the scope of the invention. For example, metal disk 21 can comprise a centering shoulder with respect to tubular element 22 and can be connected thereto by screws. The piston end can be thick enough to directly accept the disk in the above-described fittings.

The use of removable elements for the securing piston-rings allows for the use of non-slit annular piston-rings having elastic lips that reinforce the seal between the pressurized portions of chamber 1. Furthermore, the mounting of one or more piston-rings in that part of chamber 1 that forms the compression or cold side of the piston allows one to use pistons rings composed of synthetic materials having a very low friction coefficient that do not require lubrication. For example, the one or more piston-rings can be made of a material known under the brand name of "Teflon". Moreover, by equipping only the cold side of the piston with piston-rings, the machining of chamber 1 can be limited to the cold side thereof.

A sealing element is located between the above-described pressurized enclosure and housing 11 of shaft 8. This sealing element comprises a lip joint 42 in housing 1 and mounted on a shoulder 43 of shaft 8 at the level of the connection of shaft 8 with arm 3 as seen in FIG. 4. A journal bearing cross-piece 46 is mounted between two bearings 8A and 8B and around shaft 8. Lip joint 42 is attached to housing 11 and experiences counterpressure from lubricating oil for bearings 8A and 8B that is 8 injected into housing 11 by a pump P (as seen in FIG. 4B) actuated by a transmission (not shown) connected to shaft 4 of the engine. The lubricating oil is injected into housing 11 at the level of bearing 8A and is released from this housing at the level of bearing 8B. Bearings 8A and 8B comprises tapered roller bearings that serve to "double center" shaft 8 in housing 11 and in crosspiece 46 in order to obtain a surface having a constant leak section between shaft 8 and crosspiece 46, as seen in FIG. 4.

Pressurized lubrication oil is injected through an oil intake aperture 44 in journal bearing 15, between the lip joint and first bearing 8A. Journal bearing 15 supports housing 11. An oil discharge aperture 45 is provided at the end of housing 11. Aperture 44 is linked to the pump delivery system by a conduit, not shown. Aperture 45 is linked to an exhaust aperture by a conduit. The diameter of the inner aperture of journal bearing cross-piece 46 is sufficient to ensure the passage of shaft 8 and is sufficient to ensure that a laminar flow of oil is provided during its passage between the shaft and the cross-piece. As a result, the pressure of cross-piece 46 on second bearing 8B and on lip joint 47 connected to this bearing is greatly reduced.

Each engine block 9 comprises an element 42A that supports the lip of lip joint 42 in each housing 11. Element 42A comprises an elastic counter-lip 49 that engages under the lip of lip joint 42. Counter-lip 49 has a tapered shape and is adapted to be deformed as a function of the pressure difference between housing 11 and the pressurized enclosure, so as to bear on shaft 8 when shaft 8 is at rest when the pressure difference is at a maximum.

Figure 8A:
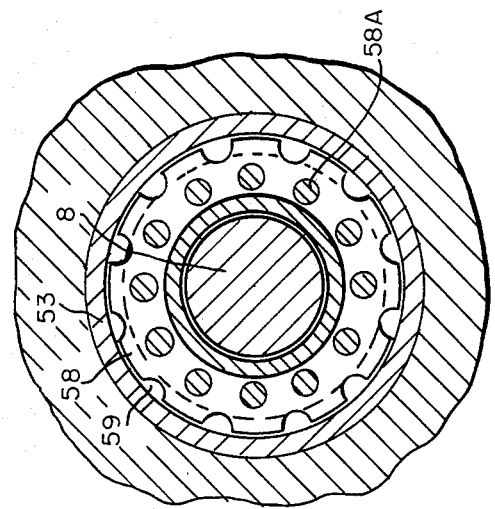
FIG. 8a is a cross-sectional view of the invention taken along line C—C seen in FIG. 8.
Figure 8:
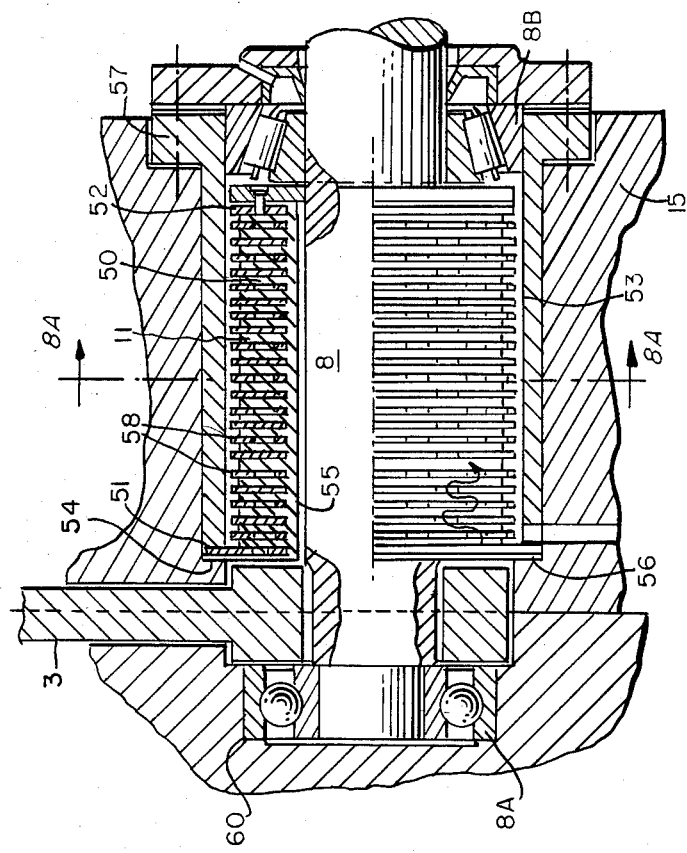
FIG. 8 is a side view of a second embodiment of the sealing means.

According to another embodiment, as shown in FIG. 8, and FIG. 8a the sealing element comprises a torsionally deformable, gas-tight, elastic wall. This wall is positioned around and is integral with shaft 8 and is also integral with one of the walls of housing 11. The elastic wall preferably comprises a cylindrical sleeve 50 adapted to deform torsionally around the axis of shaft 8. Sleeve 50 comprises two crown-shaped radial end walls 51 and 52. End wall 52 is integral with shaft 8 and end wall 51 is pressed against a shoulder 54 provided in the bottom of housing 11 forward of arm 3 and secured by tightening means 53.

The exterior diameter of sleeve 50 is slightly greater than shaft 8 to prevent any frictional contact with shaft 8. The annular space around shaft 8 between shaft 8 and sleeve 50 communicates with the pressurized enclosure of chamber 1. The seal between this annular space and housing 11 is effected by the type of connection means used between crown 52 and shaft 8, e.g. a solder connection with a sealing joint. In addition, the seal is also ensured by portion 56 of sleeve 50 provided between crown 51 and shoulder 54 of housing 1. Crown 51 has a diameter greater than that of sleeve 50 so as to cooperate with tightening means 53 in tightening of sealing joint 56.

Tightening element 53 has a tubular shape and a ring-shaped transverse section. Element 53 is inserted in housing 11 around sleeve 50. A circular collar 57 for attachment to the mouth of housing 11 is provided at one of the ends of sleeve 50. The other end of tightening means 53 is pressed against crown 51 by attachment elements of collar 57 screwed to boss 15.

Sleeve 50 also comprises reinforcement means and is cooled by the oil that also ensures the lubrication of bearing 8B. As a result, sleeve 50 can undergo radial deformations and withstand the pressure of the gas without the risk of deterioration. Reinforcement means of sleeve 50 comprises parallel metal crowns 58 embedded in the sleeve mass. One end of crowns 58 extends beyond the outer surface of the sleeve. The upper diameter of crowns 58 is less than the interior diameter of tightening means 53. Parallel metal crowns 58 are distributed according to stress calculations made with regard to the pressures experienced by the shaft or they can be regularly spaced. Metal walls 58 have transverse apertures 58A to improve the anchoring of the material comprising sleeve 50.

Each crown bears notches 59 angularly spaced around its periphery and through which cooling lubricating oil flows. Notches 59 are preferably angularly offset from one crown to the other so that the oil follows a sinuous path therethrough and so that there is increased cooling capacity. To further reduce the risk of deterioration, sleeve 50 has a length sufficient to limit the rotation angle of each crown 58. In the embodiment shown in FIG. 8, sleeve 50 covers the entire length of shaft 8 between arm 3 and second bearing 8B. In this second embodiment, bearing 8A is mounted in a bore 60 located in the block behind arm 3. Bearing 8A, which is not lubricated by the cooling oil, is a perpetually self-lubricated bearing.

The above-described sealing means effects a complete seal with negligible friction because the alternating circular motion of shaft 8 is small. For example, magnitude of the alternating circular motion of shaft 8 is equal to approximately ±7°. Consequently, any point on the surface of shaft 8 describes a circumferential arc equal to about 14°.

The above-described pressurized enclosure of each block communicates with the cold side of another block by means of a transfer circuit provided between the two engine blocks. The enclosed volume thus formed, in which the mass of gas is confined, undergoes periodic variations as a function of the stroke of each piston. This volume has a minimum value at the end of the transfer of the gas mass from the compression phase side 1B to the expansion phase side 1A. Similarly, this volume has a maximum value during the transfer of the gas mass from side 1A to side 1B.

In order to reduce the magnitude of this volume, the toroidal crown angle of the free volume of a hot or cold side substantially corresponds to the magnitude of the movement of piston 9, as seen in FIGS. 2 and 3. The toroidal crown angle, can be substantially equal to 15°, for example. As a further example, sides 1A and 1B of each block 9, respectively, can be formed by the piston head and by a removable cap inserted on the end of the toroidal-shaped sector of engine block 9. These caps are toroidally-shaped corresponding to the toroidal shape of the engine block, as shown in FIGS. 2 and 3.

Toroidally-shaped cap 12 corresponds to and is positioned on the hot side 1A of chamber 1 and therefore is called hot toroidal cap 12. Cap 12 is connected to a transfer circuit. Toroidally-shaped cap 13, which corresponds to and is positioned on the cold side 1B of chamber 1, is connected to another transfer circuit. Hot cap 12, positioned in a single engine block 9, has toroidal skirt 12A and a concave end wall 34 having apertures 35 that communicate with the transfer circuit. Concave end wall 34 penetrates inside the volume defined by skirt 12A. This wall is perpendicular to axis DD' of the transfer circuit and is coaxial thereto. Cold cap 13 has a toroidal skirt 13A and accepts a cylinder head cover 14 having apertures 14A that also permits communication between cap 13 and a transfer circuit. This head cover also is perpendicular and coaxial to axis DD' of the transfer circuit. Each cap is equipped with a centering shoulder 27 and a base 29 for attachment to the corresponding engine block. A means of sealing joint 30 is inserted between the corresponding engine block and base 29. Thermal insulation at this sealing joint prevents conduction losses, as seen in FIG. 2.

Centering shoulder 27 is seated in aperture 28 positioned in the corresponding engine block 9 at the end of toroidal chamber 1. Base 29 is attached to the block by means of several screws engaged in threaded apertures provided in bosses 31 that are distributed around the toroidal end of block 9 as seen in FIG. 2.

According to another embodiment shown in FIG. 3, the base is secured to block 9 by a threaded ring 32 that cooperates with threads 33 on cylindrical lip 40 provided at the end of the block. It is obvious that any type of removable connection can be used.

Side 1B in this embodiment is provided in block 9 whereas side 1A is provided in hot cap 12. Also in this embodiment, side 1B of chamber 1 receives a cover 14. Cover 14 can, for example, be attached to cold cap 13 as in FIG. 2 or to block 9 as in FIG. 3 by either screws or studs and nuts. These screws are engaged in threaded apertures positioned in a circular base of cold cap 13 as in FIG. 4 or in the bosses of block 9 as in FIG. 2.

It is also within the scope of the present invention to position hot side 1A in the block and to position the cold side in a cold cap 13, as well as to position both hot side 1A and cold side 1B in the toroidal body of the same engine block 9.

According to the preferred embodiment, the thermal engine is a Stirling cycle type engine. The transfer circuits are each connected to a compression phase side or cold side of a block 9 and to an expansion phase side or hot side of another block 9. Each transfer circuit comprises a heat source 5 connected to hot side 1A, a thermal accumulator 6 or regenerator, connected to heat-source 5, and a cold source 7 connected to cold side 1B and to accumulator or regenerator 6. During a cycle that corresponds to a full revolution of shaft 4, the mass of gas contained within a cold side, a cold source, a regenerator, the heat source, and a hot side is cold compressed, undergoes a constant volume heating when transferred to the hot side, expands and gives the hot side piston an impulse, and is subsequently transferred from the hot side to the cold side while undergoing constant volume cooling.

Figure 7:
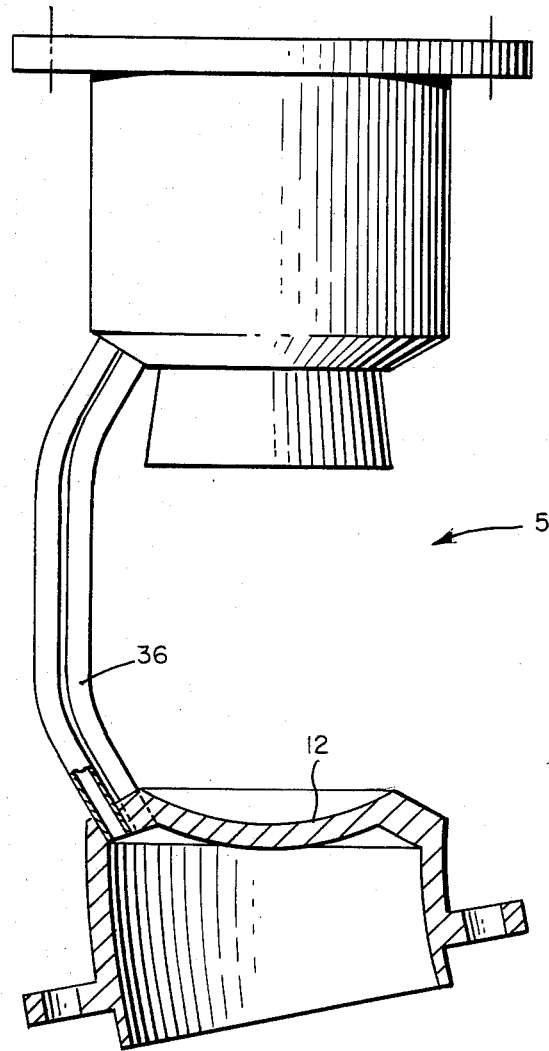
FIG. 7 is a cross-sectional view of a second embodiment of the heat source.
Figure 7A:
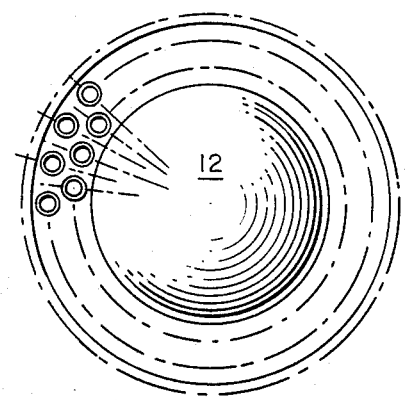
FIG. 7A is a top view of cap 12 illustrated in FIG. 7.

To reduce load losses and to keep interfering volumes to a minimum while maintaining a maximum heat exchange surface, heat source 5, regenerator 6, and cold source 7 are axially aligned along axis DD'. In addition, axis DD' is perpendicular and coaxial to end wall 34 of the hot side and to cover 14 of the cold side. These hot and cold sides are connected to this transfer circuit. Each cold or heat source comprises several conduits through which the mass of gas passes during its transfer from one chamber to the other. The conduits of each source have identical dimensions and are parallel to each other or follow the generators of a solid of revolution centered with respect to the alignment axis of each source. This arrangement ensures an equipotential connection between the two sides that are positioned opposite each other. As a result, it is possible to obtain an identical gas output in each conduit. Heat source conduits 36, for example, are each engaged and welded in an aperture 35 of cap 12 at one of their ends. The other end of conduits 36 are connected to the regenerator or thermal accumulator. According to the embodiment shown in FIG. 3, conduits 36 are positioned along the generators of two cones coupled by their large base. Further, each conduit 36 includes a loop 36A to increase heat exchange surface area. According to another embodiment shown in FIG. 7, and FIG. 7A heat source conduits 36 are positioned along the generators of a cylinder, and their ends approach the alignment axis DD' so as to connect to regenerator 5 or to hot cap 12. In order to increase the heat exchange surface area of the above-mentioned embodiment, conduits 36 are configured in two or more concentrically staggered rows. A heat source, known in itself and either internal, external, or nested within the volume defined by the conduits, cooperates with the heat source conduit.

Conduits 7A of cold source 7 in FIG. 2 are parallel with respect to each other. Conduits 7A are located in a casing 37 and are immersed in a cooling liquid. Casing 37 is equipped with a liquid intake aperture 39 and a delivery aperture both connected to a hydraulic circuit that effects circulation of the cooling liquid inside casing 37, as in FIG. 3.

The cooling liquid is preferably also driven into channels 41 provided in the part of chamber 1 kept cold so as to prevent any heating of this portion of the chamber or to keep this portion of the chamber at a constant temperature.

During the transfer of the gas from a hot side 1A to a cold side 1B, the regenerator absorbs the heat of this gas. This heat energy is restored to the gas during the reverse transfer.

Due to the distribution of the blocks around the means for transforming the alternating movement of the pistons into a circular movement transmitted to central shaft 4, the four strokes of the Stirling cycle are reproduced by circular permutation. Thus, for each revolution of shaft 4, the four masses of gas in four blocks 9 undergo respectively, a cold compression, a constant volume heating, a hot expansion, and a constant volume cooling.

As stated above, the distribution of the blocks around the means for transforming the alternating movement of the pistons into a circular movement is done in such a manner so as to position each shaft 8 at the top or a square centered on shaft 4. The means for imparting the motion of shafts 8 to shaft 4 comprises arms 70, each keyed to a shaft 8, rods 71, each journalled to an arm 70 and to a crank pin 72 integral with shaft 4, and a ring 73 positioned between crank pin 72 and shaft 4. The crank pin is eccentric with respect to shaft 4 and functions as a crankshaft.

As can be seen in FIG. 1, the distance between the journal connection of each rod to each crank pin and the journal connection of each rod to arm 70 is equal to the distance between the connection of arm 70 to shaft 8 and the journal connection of this arm to rod 71. Moreover, when the volume of a hot or cold side is zero, rod 71 is associated with this side is positioned radially with respect to shaft 4.

In addition, rods 71 are mounted on the same crank pin 72 and are rotatably mounted on ring 73, and ring 73 is in turn rotatably mounted on crank pin 72. This configuration reduces the amount of surface slippage.

Power modification of the present thermal engine depends upon the difference between the maximum pressure and the minimum pressure of the gas during a single cycle. This difference depends upon the site of the volume in which the gas is contained. Thus, the power of the engine can be varied by varying the volume in which the gas is contained. This can be accomplished by connecting an adjustable volume chamber 61 to the chamber comprising the heat source, the regenerator and the cold source, as will be discussed below.

Figure 4A:
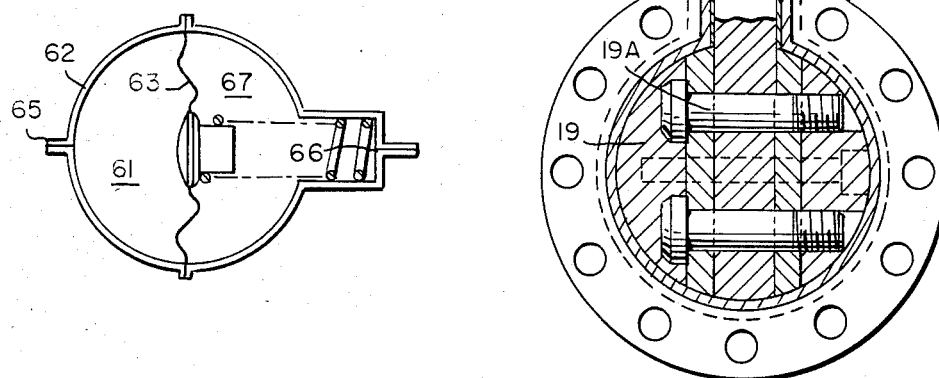
FIG. 4a is a cross-sectional schematic view of adjustable volume chamber 61.

An increase in volume leads to a reduction in the difference between the maximum and minimum values for the pressure of the gas, and also leads to a reduction in the power of the engine. Such volume variation also leads to a variation in the initial pressure of the gas or what is known as the inflating pressure. It is known that the higher the inflating pressure, the greater the difference between the maximum and minimum pressures of the gas during its cycle. The gas is contained in two continuous chambers, one of which comprises the internal volume of the heat source, of the regenerator, and of the cold source, as seen in FIGS. 3 and 4. The second chamber is an adjustable volume chamber 61 that communicates with the first chamber or pressurized enclosure via conduit 65, as seen in FIG. 3A and 4A. When the volume of chamber 61 varies, the pressure in the pressurized enclosure varies, thereby varying the power of the engine.

Adjustable volume chamber 61 preferably comprises a deformable wall 63 positioned in a casing 62 that is in communication with a pressurized fluid circuit. Deformable wall 63 ensures separation between chamber 61 and a variable volume 67 of the casing in which pressurized fluid is introduced. Casing 62 preferably is spherically-shaped and is pierced by an aperture 64 opening into chamber 61 and an aperture 66 opening into variable volume 67.

Aperture 64 receives one end of a conduit 65. The other end of this conduit preferably opens into housing 10 of the pressurized enclosure of engine block 9. Aperture 66 receives the end of a conduit 69 from the pressurized fluid circuit.

The action of the pressurized fluid on one of the surfaces of deformable wall 63 opposes the action of the pressurized gas on the other surface of the wall. A volume variation in chamber 61, and therefore a pressure variation of the gas contained inside chamber 1 and the pressurized enclosure, corresponds to a pressure variation of the fluid introduced in volume 67 of the casing. The volume variation of chamber 61 ceases when the action of the gas on one of the wall surfaces of 63 is balanced by the action of the pressurized fluid on the other surface of the wall. A pressure decrease of the gas held inside the pressurized enclosure, and therefore a decrease in engine power, corresponds to an increase of the volume of chamber 61. Conversely, an increase in gas pressure, and therefore an increase in engine power, corresponds to the decrease of the volume in chamber 61. The action of an elastic element 68 can be superimposed preferably on the action of the pressurized fluid on one of the surfaces of deformable wall or membrane 63. This elastic element can comprise, for example, a compression spring, and is provided in variable volume 67 and is pressured against deformable walls 3 and the internal wall of casing 62. A blockage element is also provided in this volume.

Preferably, the pressurized fluid circuit is connected to the pressurized oil circuit to ensure the seal between the pressurized enclosure and housing 11. As a consequence, the output of pump P controls the engine power. According to the preferred embodiment, the pressurized oil intake conduit 69, which introduces pressurized oil into volume 67, opens into housing 11 at the level of lip joint 42.

It should be noted that the action of the spring alone cannot oppose the displacement of deformable wall 63 in variable volume 67, and the oil pressure is always less than the gas pressure. It should also be noted that during full power operation, the action of the spring and the action of the pressurized oil together push deformable wall 63 against the wall of envelope 62, which reduces the volume of chamber 61 to zero. During low power operation, and during steady state continuous operation, volume 61 is preferably isolated from the pressurized enclosure by a one way flap-valve to prevent a double decrease in output.

The engine described above has the advantage of being flat and therefore compact. Moreover, the described arrangement in which the end wall of the hot side is located directly opposite the end wall of the cold side with respect to an axis DD' permits a good solution for obtaining the ideal phases of a Stirling cycle engine. Additionally, unlike thermal engines of the prior art, pistons 2 do not move in a reciprocating linear motion but in a reciprocating circular motion that is easier to transform into continuous motion transmitted to shaft 4. Moreover, the reciprocating circular motion of any shaft 8 can be transferred directly to a receptor engine such as a compressor built to the identical architecture of the thermal engine.

It also should be noted that the machining of the toroidal surfaces can be limited only to the surfaces of the cold side. Machining moreover is easily effected because of the low ratio between the mean length of the circumferential axis of this cold side and the diameter of the meridian sections of chamber 1. This ratio can be 1:1 or less.

A thermal engine has been described that is equipped with four engine blocks, but it is understood that without going beyond the scope of the present invention, a thermal engine furnished with, for example, eight toroidal blocks can be used. The thermal engine as discussed above is particularly designed to operate according to the Stirling cycle, but it is within the scope of the present invention to use thermal engines operated according to any other type of thermodynamic cycle. It also should be understood that the engine according to the present invention can have any other equipment and variations without going beyond the scope of the present invention.

I claim:
1. A thermal engine using a gas for transferring energy therein, wherein said engine comprises:
   (a) a plurality of chambers;
   (b) a plurality of double-effect pistons, one of which is positioned in each of said plurality of chambers so as to reciprocate therein, wherein each chamber and double-effect piston together comprise an expansion phase side and a compression phase side of said chamber, wherein each piston comprises an arm, and wherein each expansion phase side of one chamber is positioned directly opposite a compression phase side of another chamber;
   (c) means for connecting said plurality of chambers such that each expansion phase side of one chamber is in communication with a compression phase side of another chamber, wherein said connecting means comprises means for transmitting said gas from one side to another side due to reciprocation of said pistons;
   (d) an output shaft adapted to undergo circular movement; and
   (e) means for transforming said reciprocating motion of said pistons into circular movement of said output shaft.

2. The thermal engine defined by claim 1 wherein said plurality of chambers is positioned around said output shaft and around said transforming means.

3. The thermal engine defined by claim 2 wherein said plurality of chambers and said plurality of double-effect pistons are toroidally-shaped.

4. The thermal engine defined in claim 3 wherein said plurality of chambers comprises four chambers, each located in a quadrant on the periphery of the engine.

5. The thermal engine defined by claim 3 wherein said chambers and said connecting means form an enclosed volume in which said output shaft and said transforming means are positioned.

6. The thermal engine defined by claim 3 wherein each compression phase and each expansion phase side have the shape of a toroidal sector.

7. A thermal engine defined by claim 6 further comprising a Stirling cycle engine, wherein said connecting means further comprises a heat source, a thermal accumulator/regenerator, and a cold source, said heat source being connected to one of said expansion phase sides and said cold source being connected to one of said compression phase sides.

8. The thermal engine defined in claim 7 wherein said means for connecting said plurality of chambers further comprises an adjustable volume chamber and a conduit connecting said adjustable volume chamber with said heat source, said thermal accumulator/regenerator and said cold source, whereby the power of said engine can be varied by varying the volume of said adjustable volume chamber.

9. The thermal engine defined by claim 8 wherein said expansion phase and compression phase sides communicate with said adjustable volume chamber.

10. A thermal engine defined in claim 7 wherein said heat source, said thermal accumulator/regenerator, and said cold source are aligned along the same axis between two contiguous chambers.

11. A thermal engine defined by claim 3 wherein said transforming means comprises a plurality of rotating intermediate shafts each rigidly attached to one of said arms, wherein said engine further comprises a plurality of bearings adapted to support said plurality of intermediate shafts.

12. A thermal engine defined by claim 11 further comprising a plurality of engine blocks wherein each of said plurality of chambers is formed in one of said engine blocks.

13. A thermal engine defined by claim 12 wherein each engine block has a toroidal shaped portion and further comprises a cylindrically shaped portion, extending radially to said toroidal shaped portion, and a bearing body extending perpendicular to said cylindrical shaped portion.

14. A thermal engine defined by claim 13 further comprising a first housing for one of said arms positioned in said cylindrically shaped portion, wherein said housing communicates with said chamber, and wherein said engine further comprises a second cylindrical housing positioned in said bearing body for receiving said intermediate shaft and said bearings.

15. A thermal engine defined by claim 14 wherein said first housing communicates with said chamber and said expansion phase side so as to form a pressurized enclosure, and wherein each engine block further comprises sealing means between said pressurized enclosure and said second cylindrical housing.

16. A thermal engine according to claim 15 wherein said intermediate shaft is mounted on the bearings, wherein said engine further comprises a lip joint having a lip for sealing the pressurized enclosure from said second cylindrical housing, wherein said engine further comprises a journal bearing cross-piece positioned between said two bearings and around said intermediate shaft, wherein said engine further comprises: means for receiving oil at the level of one of said bearings in said second housing; means for transferring oil out of said second housing at the level of the other of said bearings; lubricating oil injected through said receiving means and released by said transferring means, whereby counterpressure on said lip of said lip joint results from injection of said oil; and means for double centering said intermediate shaft in said second housing and with respect to said cross-piece so as to obtain a constant leak section surface between said intermediate shaft and said cross-piece.

17. A thermal engine defined in claim 16 wherein said oil comprises pressurized oil injected into said housing between said lip joint and one of said bearings, and wherein said cross-piece comprises an internal aperture having a diameter sufficiently large to permit the passage of said intermediate shaft and to permit a laminar layer of oil to exist between said intermediate shaft and said journal bearing cross-piece to decrease pressure on said joint of said shaft.

18. A thermal engine defined by claim 15 wherein said sealing means further comprises a torsionally deformable, gas-tight, elastic wall of said pressurized enclosure, wherein said wall is positioned around said intermediate shaft and is integral with said intermediate shaft with one of the walls of said second housing.

19. A thermal engine defined by claim 18 wherein said elastic wall is in the shape of a sleeve and further comprises two crown-shaped walls wherein one crown-shaped wall is integral with said intermediate shaft and the other crown-shaped wall is secured by a tightening means against a shoulder of said second housing.

20. A thermal engine defined in claim 17 further comprising a pressurized fluid circuit and an adjustable volume chamber comprising an envelope and a deformable wall in said envelope, wherein said adjustable volume chamber communicates with said pressurized fluid circuit and the internal volume of said heat source, the internal volume of said thermal accumulator/regenerator, and the internal volume of a said cold source.

21. A thermal engine defined in claim 20 wherein said second housing forms an oil circuit, and wherein said pressurized fluid circuit is in communication with said oil circuit thereby ensuring a counterpressure at the level of said lip joint.

22. A thermal engine defined in claim 13 further comprising a removable cap inserted on said toroidally-shaped engine block wherein said expansion phase side and said compression phase side are formed in said removable cap.

23. A thermal engine defined by claim 22 wherein said removable cap associated with said expansion phase side comprises a toroidal skirt and concave end wall penetrating into a volume defined by said skirt, said wall comprising apertures therein allowing free communication with said connecting means.

24. A thermal engine defined by claim 22 wherein said removable cap associated with said compression phase side comprises a toroidal skirt.

25. A thermal engine defined by claim 22 wherein said removable cap associated with said compression phase side comprises a cylinder head cover having apertures therein allowing free communication with said connecting means.

26. A thermal engine defined by claim 7 wherein said heat and cold sources comprises a plurality of conduits wherein said conduits are traversed by said gas during transfer from one of said chambers to another of said chambers wherein said conduits of each said source have identical shapes, lengths, and diameters.

27. A thermal engine defined by claim 26 wherein said conduits of said heat source comprise a loop.

28. A thermal engine defined by claim 3 wherein said pistons are adapted to undergo reciprocating circular movement and said output shaft is adapted to rotate, wherein said engine further comprises movement means for transforming said reciprocating circular movement of said piston into rotating motion of said output shaft.

29. A thermal engine defined by claim 28 wherein said transforming means comprises a plurality of intermediate shafts and a plurality of intermediate arms, each keyed to one of said intermediate shafts; rods each journalled to one of said intermediate arms; and a crank pin integral with said output shaft, wherein each rod is also journalled on said crank pin.

30. A thermal engine defined by claim 29 wherein said crank pin comprises a ring interposed between said crank pin and said output shaft, wherein said crank pin is eccentric with respect to said shaft and wherein said crank comprises a crankshaft.

31. A thermal engine defined by claim 30 wherein said plurality of rods are rotatably mounted on said ring and said ring is rotatably mounted on said crank pin whereby the area of slippage surfaces under rotation is reduced.

32. A thermal engine defined by claim 3 further comprising a plurality of identical engine blocks wherein each block comprises two joined half-shells, said half-shells of said engine blocks comprising a longitudinal mating surface wherein one of said two joined half-shell makes with the other of said two joined half-shells at said longitudinal mating surface wherein said mating surface is median with respect to one of said chambers.

33. A thermal engine defined by claim 14 further comprising a plurality of identical engine blocks each comprising two joined half-shells each half-shell comprising a mating surface transverse to said chamber and the median of said second housing and adapted to mate with an identical mating surface on the other half-shell.

34. A thermal engine defined by claim 16 wherein each second housing in each engine block further comprises means for supporting said lip of said lip joint, wherein said support means comprises an elastic counter-lip that engages under said lip of said joint, said counter-lip having a tapered shape and being adapted to deform as a function of the difference in pressure between said second housing and said pressurized enclosure, so as to bear upon said intermediate shaft when said intermediate shaft is at rest when the pressure difference is maximum in each said engine block equipped with each said housing.

35. A thermal engine defined by claim 19 wherein said sleeve comprises a frame comprising parallel metal crowns distributed in one of the following manners: in a predetermined pattern based on stress calculations or at regularly spaced intervals, wherein said metal crowns are embedded in said sleeve and wherein the periphery of said metal crowns projects beyond the outer surface of said sleeve.

36. A thermal engine defined by claim 63 wherein said crowns comprising the frame of said sleeve have notches angularly spaced and angularly offset with respect to notches on another said crown so that said flow of lubricating oil describes a sinuous path therethrough.

37. A thermal engine defined in claim 47 wherein said tightening element comprises a cylindrical tubular element fitted in said second housing around said sleeve having a circular base for attachment to the mouth of said second housing at one of its ends.

38. A thermal engine defined by claim 48 wherein said adjustable volume chamber further comprises a variable volume portion of said enclosure adapted to receive pressurized fluid, wherein said variable volume portion comprises an elastic element pressing against said wall, said enclosure wall, and a blockage element.

* * * * *